US012078319B1

(12) United States Patent
Wang et al.

(10) Patent No.: US 12,078,319 B1
(45) Date of Patent: Sep. 3, 2024

(54) EASILY ASSEMBLED AND DISASSEMBLED LAMPSHADE

(71) Applicant: SHENZHEN TIANYU HARDWARE & ELECTRICAL CO., LTD, Guangdong (CN)

(72) Inventors: Lijun Wang, Guangdong (CN); Shiqing Chen, Guangdong (CN)

(73) Assignee: SHENZHEN TIANYU HARDWARE & ELECTRICAL CO., LTD, Guangdong (CN)

( * ) Notice: Subject to any disclaimer, the term of this patent is extended or adjusted under 35 U.S.C. 154(b) by 0 days.

(21) Appl. No.: 18/591,133

(22) Filed: Feb. 29, 2024

(30) Foreign Application Priority Data

Dec. 20, 2023 (CN) ........................ 202323497233.0

(51) Int. Cl.
*F21V 1/24* (2006.01)
*F21V 1/08* (2006.01)
*F21V 17/06* (2006.01)

(52) U.S. Cl.
CPC .................. *F21V 1/24* (2013.01); *F21V 1/08* (2013.01); *F21V 17/06* (2013.01)

(58) Field of Classification Search
CPC ..... F21V 1/08; F21V 1/24; F21V 1/04; F21V 17/06
USPC ................................ 362/353, 319, 347, 350
See application file for complete search history.

(56) References Cited

U.S. PATENT DOCUMENTS 5,274,537 A * 12/1993 Altman ............... F21V 21/0824 428/7
5,582,479 A * 12/1996 Thomas ................ F21V 7/0025 362/346
5,911,501 A * 6/1999 Katz .................. F21V 21/0824 362/267
2014/0071697 A1* 3/2014 Portmann ................. F21V 7/18 362/319

* cited by examiner

*Primary Examiner* — Laura K Tso
(74) *Attorney, Agent, or Firm* — Cooper Legal Group, LLC

(57) ABSTRACT

An easily assembled and disassembled lampshade includes a cover body, a bulb holder and a fixing seat. The bulb holder and the fixing seat are in threaded connection. The fixing seat is provided with buckles, and the cover body is provided with snap-fit holes for insertion of the buckles.

10 Claims, 9 Drawing Sheets

A

EASILY ASSEMBLED AND DISASSEMBLED LAMPSHADE

CROSS-REFERENCE TO RELATED APPLICATION

This application claims the priority and benefit of a Chinese patent application No. 202323497233.0, filed on Dec. 20, 2023. The entirety of Chinese patent application No. 202323497233.0 is hereby incorporated by reference herein and made a part of this specification.

TECHNICAL FIELD

The disclosure relates to the technical field of aluminum lampshades, and in particular to an easily assembled and disassembled lampshade.

BACKGROUND ART

The lampshade is generally arranged on the outer side of the bulb, which can gather the lights together. It enhances the lighting effect, and also protects human eyes.

There are many types of lampshades, one of which is aluminum lampshades. Referring to FIG. 1, the aluminum lampshade includes a cover body 1, a bulb holder 2 and a fixing seat 3. A screw hole 211 is provided in the bulb holder 2. The screw hole 211 can be screwed to the end of the bulb, so that the bulb is fixedly installed on the bulb holder 2. The cover body 1 is provided with a mounting hole 111. The first end of the bulb holder 2 is located inside the cover body 1, and the second end of the bulb holder 2 is located outer side the cover body 1. The second end of the bulb holder 2 is provided with external threads and screwed to the fixing seat 3, so that the bulb holder 2 and the fixing seat 3 are clamped on both sides of the cover body 1, so as to install the bulb holder 2 and the fixing seat 3 on the cover body 1. The wire 4 passes through the fixing seat 3 and is connected to the contact on the bulb holder 2.

The various components of the aluminum lampshade are usually placed in the packaging bag in a discrete form, so that the space occupied, and thus transportation and storage cost is reduced. After receiving the goods, users need to assemble the lampshades themselves and then insert the bulbs for use.

When assembling the lampshade, the user needs to at first insert the bulb holder 2 through the mounting hole 111 on the cover body 1, then place the fixing seat 3 at the corresponding position outer side the cover body 1, and then rotate the fixing seat 3, so that the fixing seat 3 is screwed to the bulb holder 2. After the Installation of the fixing holder 3 and the bulb holder 2 is completed, the bulb is screwed into the bulb holder 2. Warehouses, workshops or other large places often require a large number of lamps. Therefore, a large number of lampshades need to be assembled after receiving the goods. The assembly process of the lampshades in the above process is more complicated, which increases the workload and worsens the use experience.

SUMMARY

In order to facilitate the splicing process of the lampshade, this disclosure provides an easily assembled and disassembled lampshade.

The easily assembled and disassembled lampshade includes a cover body, a bulb holder and a fixing seat. The bulb holder and the fixing seat are in threaded connection. The fixing seat is provided with buckles, and the cover body is provided with snap-fit holes for insertion of the buckles.

According to the above implementation, the fixing seat can be installed on the cover body by snapping the buckle into the snap-fit hole. Therefore, the splicing and assembly process is simple. It helps to improve the use experience.

Optionally, a mounting sheet is slidably sleeved on the outer side of the bulb holder. A plurality of buckles is provided. The buckles are arranged on the mounting sheet along the circumferential direction, and the mounting sheet is located between the bulb holder and the fixing seat.

According to the above implementation, the mounting sheet is sleeved on the bulb holder, and then the fixing seat is screwed onto the bulb holder, so that the fixing seat and the bulb holder abut against both sides of the mounting sheet respectively, so as to fix the mounting sheet. It is convenient to quickly complete the assembly of the mounting sheet and the buckle. Because the buckle is provided on the mounting sheet, the buckle and the mounting sheet are integrally formed to facilitate production and processing.

Optionally, the lampshade includes further a mounting bracket, wherein the mounting bracket includes a first fixing clip and a second fixing clip disposed at an end of the first fixing clip, the second fixing clip includes clamping plates, a locking bolt and a locking nut. Two clamping plates are provided. The two clamping plates are configured to clamp the outer wall of the fixing seat on both sides, the locking bolt passes between the two clamping plates, and the locking nut is screwed onto the locking bolt.

According to the above implementation, the first fixing clip is configured to be clamped and fixed on the plate or beam, and the second fixing clip is configured to clamp the fixing seat, thus it is convenient to install the lampshade at the required position.

Optionally, the first fixing clip is provided with a mounting block, the mounting block is rotatably connected with a rotating rod, the rotating rod slidably passes between the two clamping plates, the rotating rod is provided with a limiting block, each of the two clamping plates is provided with a limiting slot which is passed through by the limiting block, an adjustment assembly is provided between the mounting block and the rotating rod, the adjustment assembly includes a worm and a worm gear, the worm is rotatably arranged on the mounting block, the worm gear is coaxially arranged on the rotating rod, and the worm gear is engaged with the worm.

According to the above implementation, the Rotation of the worm can drive the worm gear to rotate. The worm gear drives the rotating rod to rotate. The rotating rod drives the clamping plate to rotate, and thus drives the fixing seat and the cover body to rotate, so that the cover body can swing up and down, which facilitates the adjustment of orientation of the cover body to suit different needs.

Optionally, a support disc is provided on the first fixing clip, the mounting block is rotatably arranged on the support disc, a locking assembly is provided between the support disc and the mounting block, the locking assembly includes a gear, a tooth block and a spring, the gear is arranged on the mounting block, the axis of the gear is coaxial with the rotation axis of the mounting block, and the tooth block is slidably arranged on the support disc, the spring is connected between the tooth block and the support disc, the teeth of the tooth block are arranged towards the gear, the spring causes the tooth block to abut against the gear.

According to the above implementation, the tooth block is slid to the side away from the gear, then rotating the mounting block. When the mounting block is rotated to the desired orientation, releasing the spring. The spring enables the tooth block to slide until it is engaged with the gear. Thus, the mounting block is fixed, so that the cover body can be rotated around another axis. Therefore, it can be suitable for different needs and the applicable situation is further expanded.

Optionally, a driving assembly is provided on the fixing seat, the driving assembly includes a connecting ring and a connecting rope, the connecting ring is sleeved on the outer side of the fixing seat, the connecting ring is rotatably connected with the fixing seat, the number of the connecting rope is the same as the number of the buckle, the first end of the connecting rope is connected to the outer side of the connecting ring, and the second end of the connecting rope is connected to a corresponding buckle.

According to the above implementation, the rotation of the connecting ring can drive the first end of the connecting rope to rotate, so that the second end of the connecting rope can drive the end of the buckle to move. As the connecting ring rotates, the buckle can be gradually disengaged from the snap-fit hole, thereby it is easy to remove the fixing seat from the cover body. The disassembly process is easier.

Optionally, the connecting ring is screwed with a limiting bolt, and the fixing seat is provided with a socket for the end of the limiting bolt.

According to the above implementation, under normal conditions, the end of the limiting bolt is inserted into the socket, thereby limiting the rotation of the connecting ring relative to the fixing seat, thus is helps to maintain the stability of the engagement between the buckle and the snap-fit hole, so as to prevent the accidental rotation of the connection ring, which cause the disengagement of the buckle from the snap-fit hole.

Optionally, a guide rod is provided on a side of the mounting sheet on which one of the buckles (51) is arranged, when the connecting rope abuts against the guide rod, a section of the connecting rope close to the buckle is arranged along the radial direction of the fixing seat.

According to the above implementation, the guide rod can change the orientation of the connecting rope, thereby changing the direction of the force exerted by the connecting rope on the buckle, so that it is easier to drive the end of the buckle to move by means of the connecting rope when the connecting ring rotates. The rotation process of the connecting ring is less laborious.

Optionally, a lever is provided on the outer side of the connecting ring.

According to the above implementation, the lever is facilitating the holding by the operator, and thus facilitates to rotate the connecting ring. Hand slipping is less likely to occur during rotation.

Optionally a bump is provided on the outer side of the connecting ring, and a stopper is provided on the mounting sheet, when the bump abuts against the stopper, the connecting rope is in a stretched state, and the buckle is not deformed.

According to the above implementation, the cooperation of the bump and the stopper can limit the rotation direction of the connecting ring, so that the connecting ring can only rotate in one direction. After the connecting ring is rotated, the end of the buckle can be driven by the connecting rope to move, which facilitates the disassembly of the fixing seat. In addition, the cooperation of the bump and the stopper can also be used for positioning. When the bump and the stopper abut against each other, the limiting bolt and the socket are in a coaxial position, so that it is convenient to screw the end of the limiting bolt into the socket.

To sum up, the disclosure includes at least one of the following beneficial technical effects:

1. The combination of buckles and snap-fit holes makes it easier to install the fixing seat on the cover body, which helps reduce the workload during the installation process and improves the use experience when a large number of lampshades need to be assembled.
2. The clamping plate is rotatably arranged on the mounting block, the mounting block is rotatably arranged on the support disc. Therefore, the orientation of the cover body and the bulb installed in the cover body can be adjusted to suit different needs.
3. When rotating the connecting ring, the connecting ring can drive the end of the buckle to move through the connecting rope, so that the plurality of buckles can be disengaged from the snap-fit holes at the same time, so as to quickly remove the fixing seat from the cover body. The operation is easier.

REFERENCE SIGNS

1. cover body; 11. flat portion; 111. mounting hole; 112. snap-fit hole; 113. hanging rod; 12. cambered portion; 2. bulb holder; 21. holder body; 211. screw hole; 22. skirt edge; 3. fixing seat; 31. threaded hole; 4. wire; 5. mounting sheet; 51. buckle; 52. guide rod; 53. stopper; 6. first fixing clip; 61. torsion spring; 62. clamping portion; 7. second fixing clip; 71. clamping plate; 711. straight portion; 7111. limiting slot; 712. arc portion; 72. locking bolt; 73. locking nut; 8. mounting block; 9. rotating rod; 91. limiting block; 10. adjustment assembly; 101. worm; 102. worm gear; 13. support disc; 14. locking assembly; 141. gear; 142. tooth block; 143. spring; 15. driving assembly; 151. connecting ring; 1511. lever; 1512. bump; 152. connecting rope; 16. limiting bolt; 17. limiting post.

DETAILED DESCRIPTION

The disclosure will be further described in detail below in combination with Figures.

Figure 1:
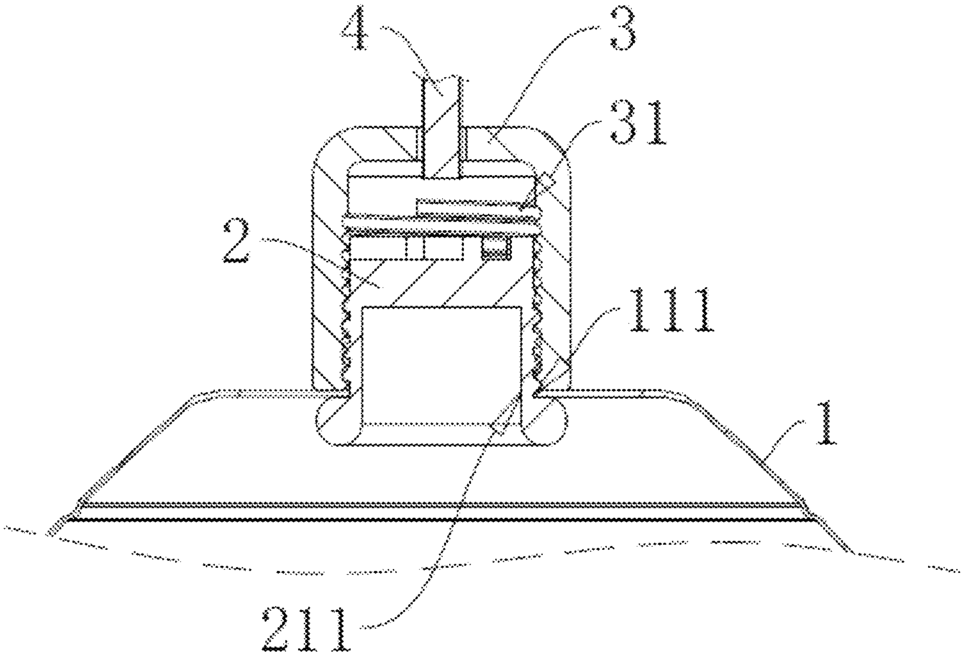
FIG. 1 (Prior Art)
FIG. 1 is a schematic diagram of an assembled lampshade in the existing technology.
Figure 2:
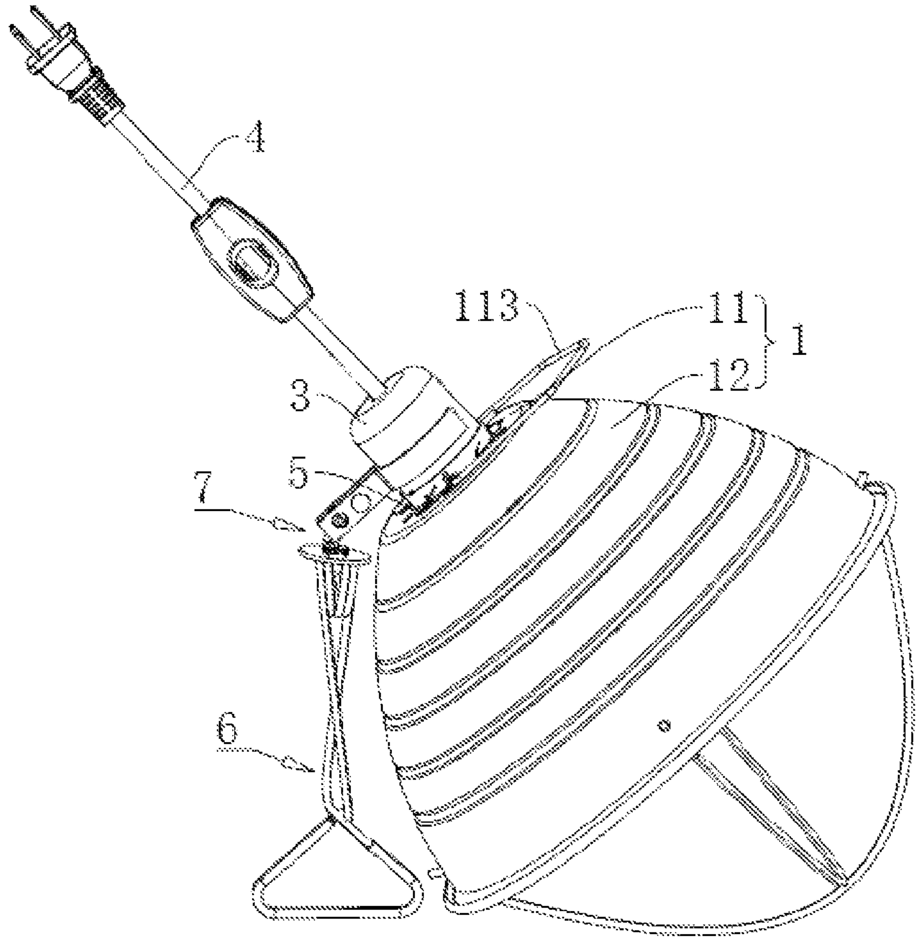
FIG. 2 is a schematic diagram of an overall structure of an embodiment of the disclosure.
Figure 3:
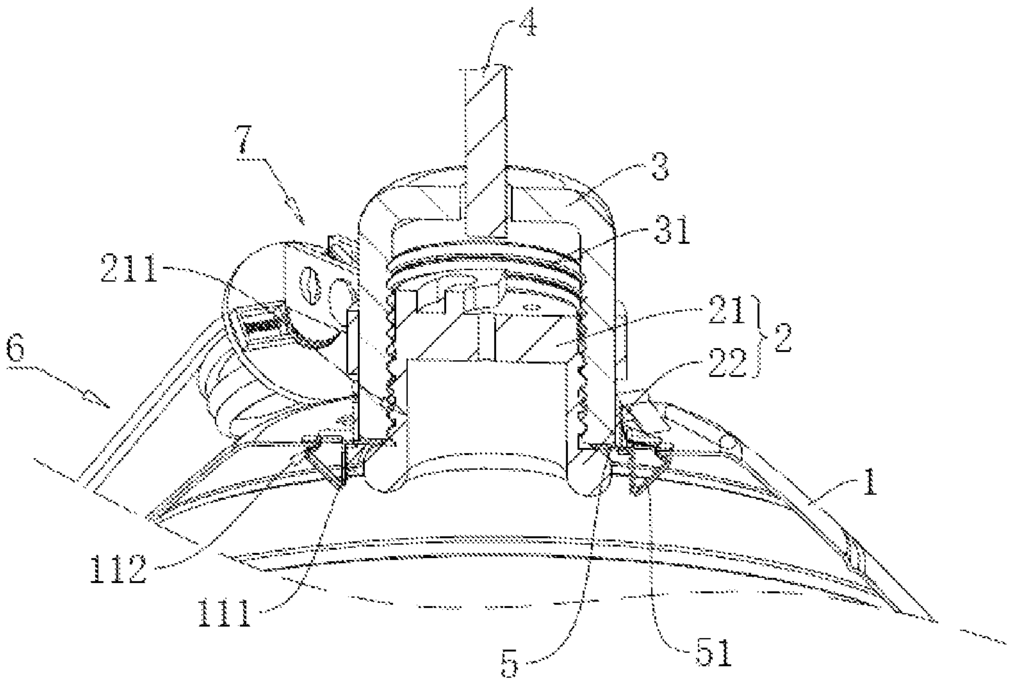
FIG. 3 is a sectional view of the embodiment of the disclosure.

An embodiment of the disclosure discloses an easily assembled and disassembled lampshade. Referring to FIG. 2 and FIG. 3, the easily assembled and disassembled lampshade includes a cover body 1, a bulb holder 2 and a fixing seat 3. The cover body 1 includes a flat portion 11 and a cambered portion 12. The flat portion 11 is provided with a mounting hole 111.

The bulb holder 2 includes a holder body 21 and a skirt edge 22; the holder body 21 is cylindrical. The skirt edge 22 is annular. The skirt edge 22 and the holder body 21 are coaxially arranged, and the skirt edge 22 is fixedly connected to an end of the holder body 21. A screw hole 211 is configured at an end of the holder body 21 close to the skirt edge 22. The screw hole 211 is configured to screw with the bulb. The inner diameter of the skirt edge 22 is the same as the inner diameter of the screw hole 211. The outer diameter of the skirt edge 22 is larger than the outer diameter of the holder body 21, and the outer diameter of the skirt edge 22 is smaller than the diameter of the mounting hole 111. Therefore, the skirt edge 22 can be inserted into the mounting hole 111, so that the bulb located in the cover body 1 can pass through the skirt edge 22 and be screwed to the screw hole 211 on the holder body 21. The outer wall of the holder body 21 is provided with external threads, and the fixing seat 3 is coaxially provided with a threaded hole 31, so that the fixing seat 3 can be screwed to the bulb holder 2. One end of the fixing seat 3 is provided with a through hole. A wire 4 passes through the through hole. The end of the wire 4 protrudes into the fixing seat 3 is connected to the contact on the holder body 21, so as to supply power to the bulb.

Figure 4:
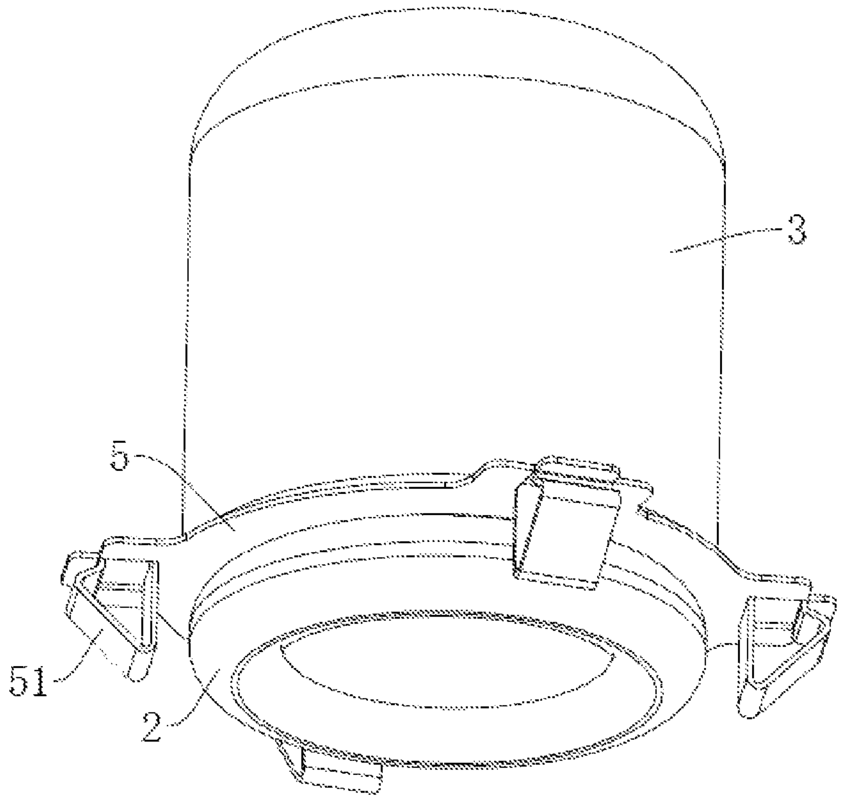
FIG. 4 is a schematic diagram of assembled fixing seat, bulb holder and mounting sheet of the embodiment of the disclosure.

Referring to FIG. 3 and FIG. 4, on the outer wall of the holder body 21 is sleeved with a mounting sheet 5 that slides along its axis. The mounting sheet 5 is annular. The outer diameter of the mounting sheet 5 is larger than the diameter of the mounting hole 111, and the inner diameter of the mounting sheet 5 is slightly larger than the diameter of the holder body 21, and the inner diameter of the mounting sheet 5 is smaller than the outer diameter of the fixing seat 3. The mounting sheet 5 is located between the skirt edge 22 and the fixing seat 3. Rotating the fixing seat 3, when the fixing seat 3 and the holder body 21 are screwed together, the fixing seat 3 and the skirt edge 22 abut against both sides of the mounting sheet 5 respectively, thereby the mounting sheet 5 is fixedly connected to the fixing seat 3. An end of the mounting sheet 5 close to the skirt edge 22 is provided with buckles 51. There are four buckles 51 arranged in circumferential direction. The buckles 51 and the mounting sheet 5 are stamped from manganese steel material, and the buckles 51 can be elastically deformed. Correspondingly, the flat portion 11 of the cover body 1 is provided with snap-fit holes 112. There are four snap-fit holes 112 corresponding to the four buckles 51 respectively. After the buckles 51 are snapped into the corresponding snap-fit holes 112, the fixing seat 3 can be fixedly connected to the outer side of the cover body 1. The installation process of the fixing seat 3 is simple.

A hanging rod 113 is also rotatably connected to the outer wall of the flat portion 11 of the cover body 1, which is on the one hand convenient for holding, and on the other hand convenient for hanging the lampshade.

Figure 5:
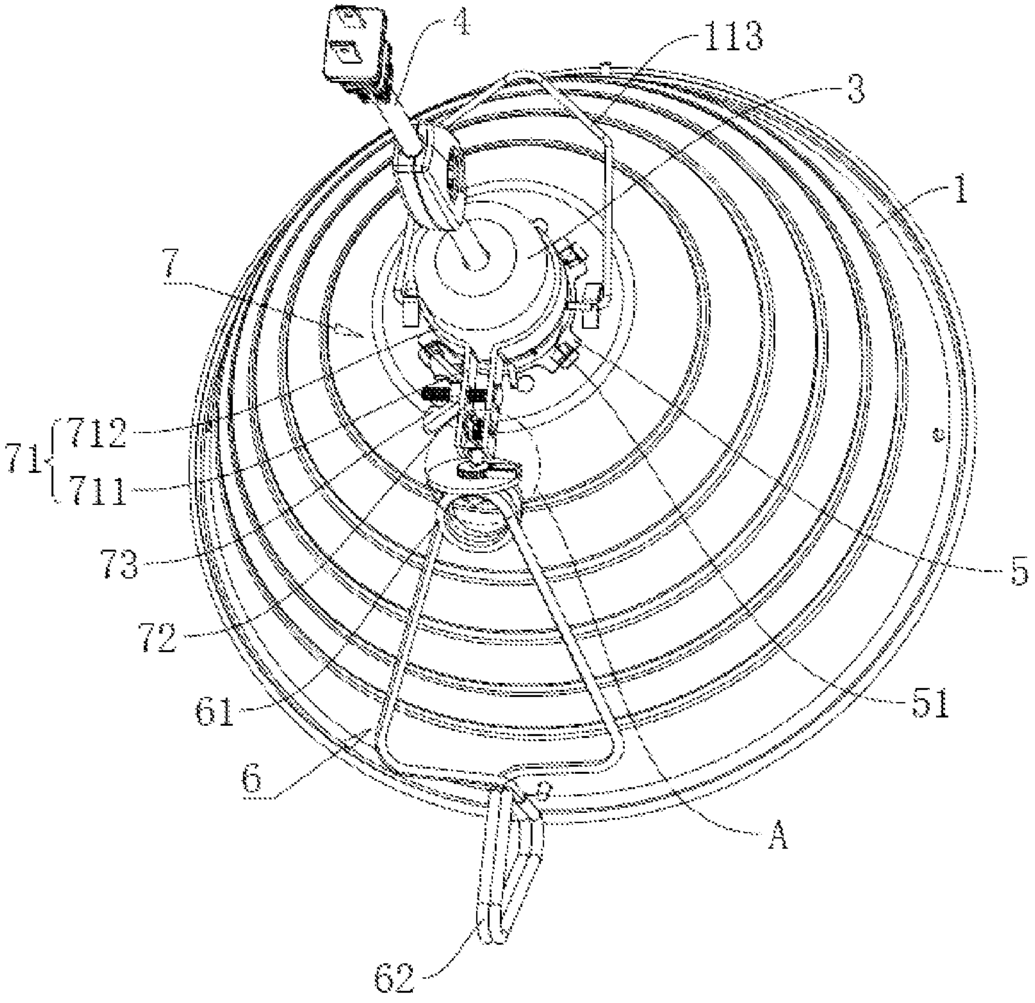
FIG. 5 is a schematic diagram of an overall structure of the embodiment of the disclosure from another perspective.
Figure 6:
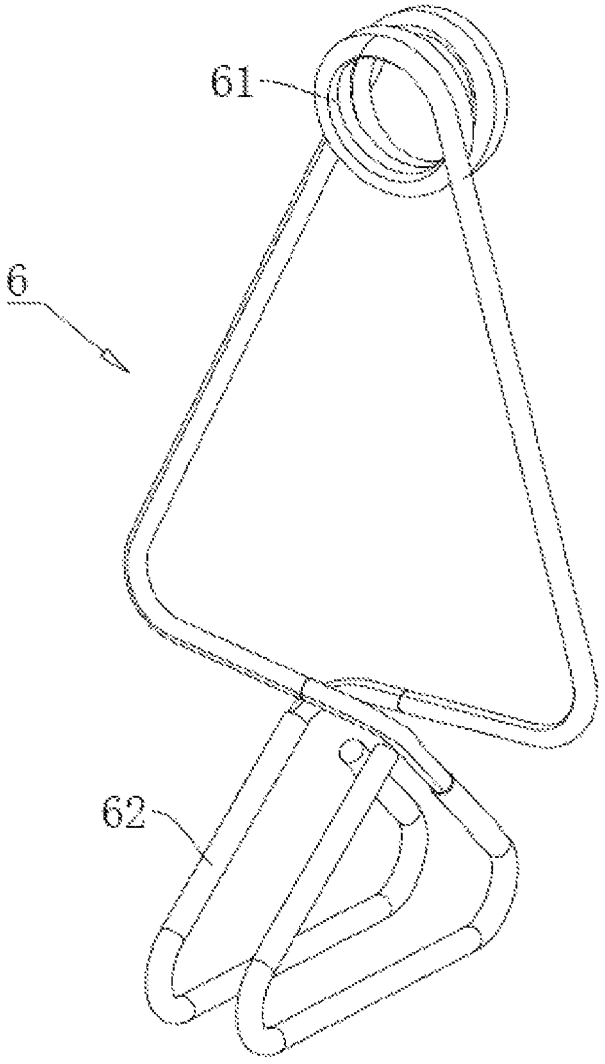
FIG. 6 is a schematic diagram of the first fixing clip in the embodiment of the disclosure.

Referring to FIG. 5 and FIG. 6, the lampshade also includes a mounting bracket. The mounting bracket includes a first fixing clip 6 and a second fixing clip 7 provided at an end of the first fixing clip 6. The first fixing clip 6 includes a torsion spring 61 and a clamping portion 62 fixedly connected to both ends of the torsion spring 61. The torsion spring 61 causes the two clamping portions 62 to tend to abut against each other. The second fixing clip 7 is located at an end close to the torsion spring 61. The second fixing clip 7 is connected to the fixing seat 3. Therefore, the torsion spring 61 can cause the two clamping portions 62 to be clamped on a plate or beam, thereby fixing the first fixing clip 6 at the required installation position to complete the installation of the lampshade.

Referring to FIG. 5, the second fixing clip 7 includes a clamping plate 71, a locking bolt 72 and a locking nut 73. There are two clamping plates 71. The clamping plate 71 includes a straight portion 711 and an arc portion 712 fixedly connected to an end of the straight portion 711. The two straight portions 711 are spaced apart in parallel. The two arc portions 712 are arc-shaped, and the curvature of the arc portion 712 is the same as the curvature of the outer wall of the fixing seat 3, so that the two arc portions 712 can respectively abut against the outer wall on both sides of the fixing seat 3, thereby clamping the fixing seat 3. The locking bolt 72 perpendicularly passes between the two straight portions 711. The locking nut 73 is screwed to the locking bolt 72, and the two straight portions 711 are both located between the head of the locking bolt 72 and the locking nut 73. Therefore, the two clamping plates 71 can be fixed by tightening the locking nut 73, so that the clamping plates 71 and the fixing seat 3 are fixedly connected. In particular, the locking nut 73 is a butterfly nut, which makes the rotation more labor-saving and convenient, and can be easily rotated without other tools.

Figure 7:
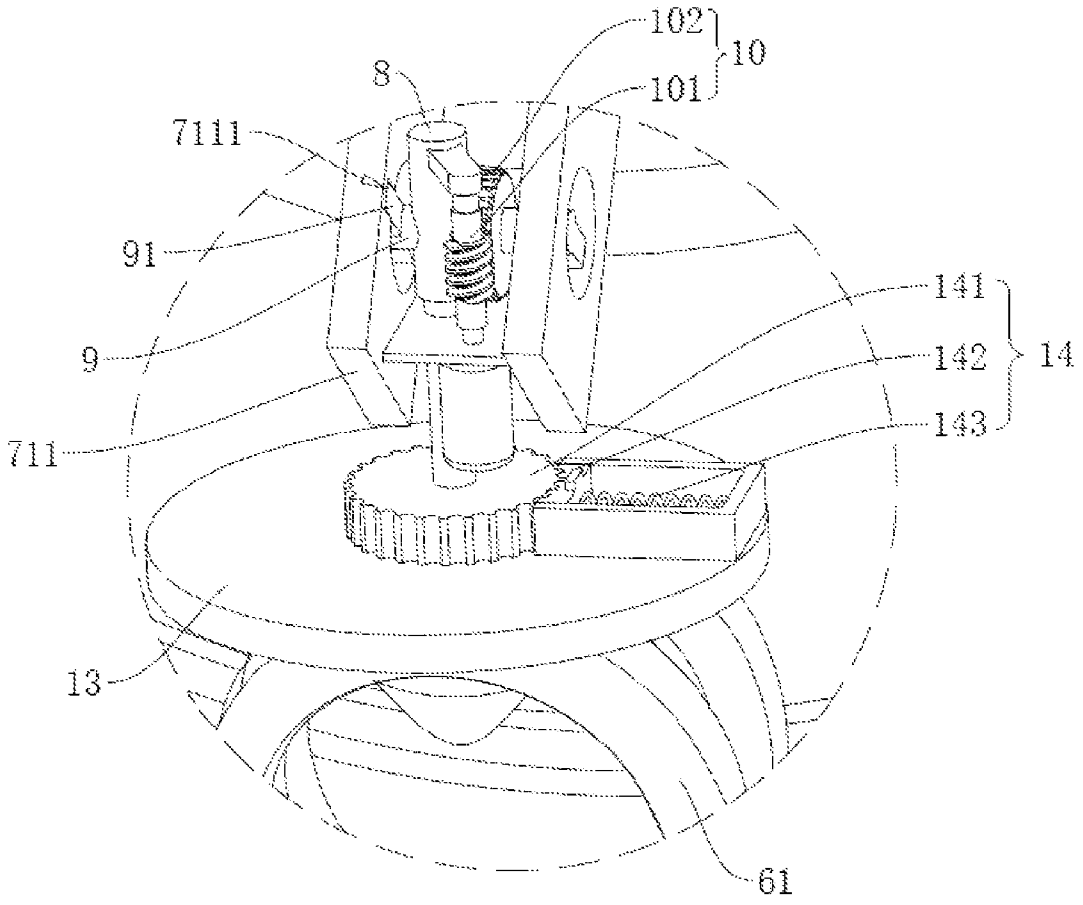
FIG. 7 is an enlarged schematic diagram of area A in FIG. 5.

In order to facilitate the adjustment of the orientation of the cover body 1 and the bulb, referring to FIG. 7, the clamping plate 71 is rotatably arranged on the first fixing clip 6. A mounting block 8 is provided at an end of the first fixing clip 6 close to the torsion spring 61. A rotating rod 9 is provided on the mounting block 8. The rotating rod 9 is arranged on the mounting block 8 rotatably along its own axis. Both ends of the rotating rod 9 are fixedly connected with a limiting block 91. The straight portions 711 of the two clamping plates 71 are both provided with a limiting slot 7111. The limiting block 91 at both ends of the rotating rod 9 are respectively engaged in the limiting slots 7111 on both sides, thus the rotation of the rotating rod 9 relative to the clamping plates 71 can be restricted, so that the rotation of the rotating rod 9 can drive the clamping plates 71 to rotate.

Referring to FIG. 7, an adjustment assembly 10 is provided between the mounting block 8 and the rotating rod 9. The adjustment assembly 10 includes a worm 101 and a worm gear 102. The worm 101 is rotatably arranged on the mounting block 8. The worm gear 102 is coaxially fixedly connected to the rotating rod 9, and the worm gear 102 is located between the two straight portions 711. The worm 101 and the worm gear 102 are engaged, so that the rotation of the worm 101 can drive the worm gear 102 to rotate, thereby driving the rotating rod 9 to rotate, so that the rotating rod 9 drives the clamping plates 71 to rotate, and the clamping plates 71 drive the fixing seat 3 and the cover body 1 to rotate, thereby adjusting the orientation of the cover body 1. After the rotation is completed, the self-locking of the worm gear 102 and the worm 101 enables the cover body 1 to stay in the current position.

In order to further expand the adjustment range of the orientation of the cover body 1 and the bulb, a support disc 13 is fixedly connected to an end of the first fixing clip 6 close to the mounting block 8. The mounting block 8 is rotatably arranged on the support disc 13, and the rotation axis of the mounting block 8 is perpendicular to the rotation axis of the rotating rod 9. A locking assembly 14 is provided between the support disc 13 and the mounting block 8.

The locking assembly 14 includes a gear 141, a tooth block 142 and a spring 143. The gear 141 is fixedly connected to the mounting block 8, and the rotation axes of the gear 141 and the mounting block 8 are coaxial. Therefore, when the mounting block 8 rotates, the gear 141 can be driven to rotate. The tooth block 142 is slidably disposed on the surface of the support disc 13. The sliding direction of the tooth block 142 is parallel to the surface of the support disc 13, and the gear 141 is located in the moving path of the tooth block 142. The teeth of the tooth block 142 are arranged towards the gear 141. The spring 143 is connected between the side of the tooth block 142 away from the gear 141 and the support disc 13. The spring 143 is in a compressed state. The spring 143 makes the tooth block 142 abut against the gear 141, and the tooth block 142 is engaged with the gear 141. Therefore, the tooth block 142 can limit the rotation of the gear 141, and thus limit the rotation of the mounting block 8. When the mounting block 8 rotates, it can drive the rotating rod 9 to rotate. The rotation drives the fixing seat 3 and the cover body 1 to rotate by means of the clamping plate 71. After the cover body 1 is rotated to the desired orientation, releasing the spring 143. The tooth block 142 slides, until it is engaged with the gear 141, thereby fixing the cover body 1 in this position.

Figure 8:
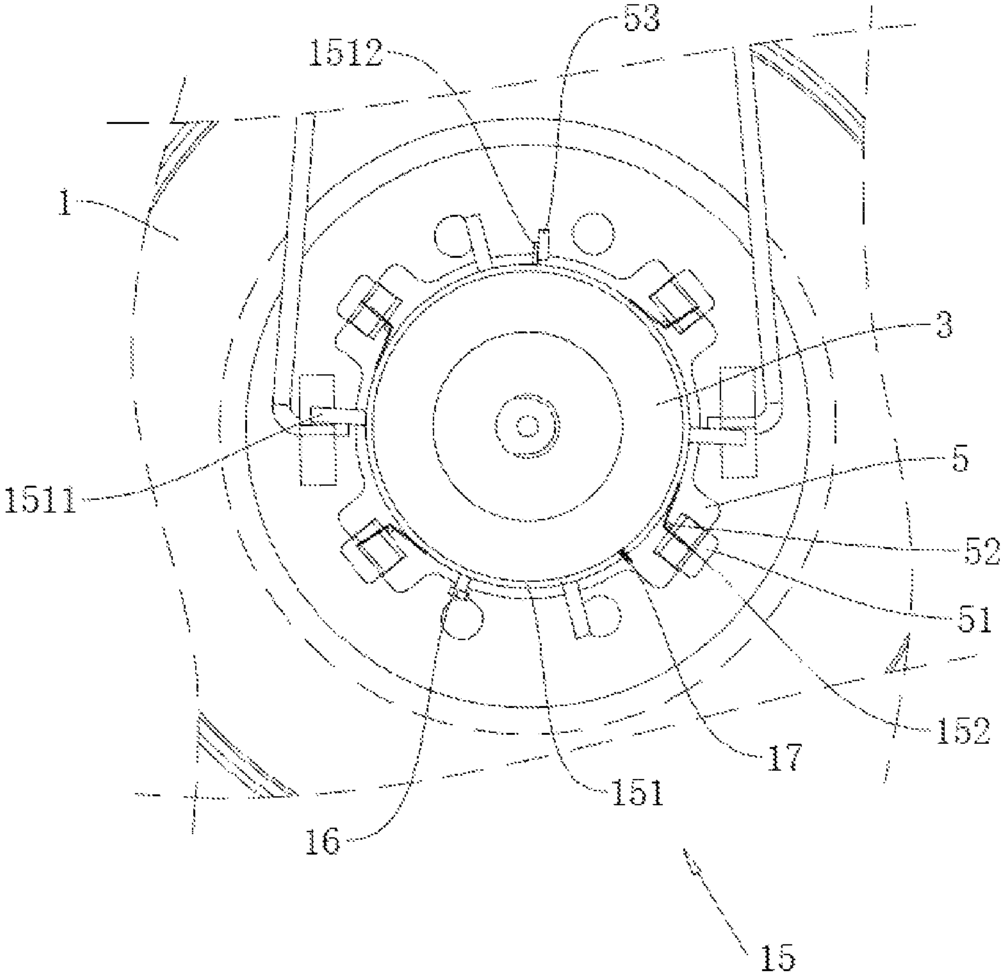
FIG. 8 is a schematic diagram of the top on outer side of the cover body in the embodiment of the disclosure.
Figure 9:
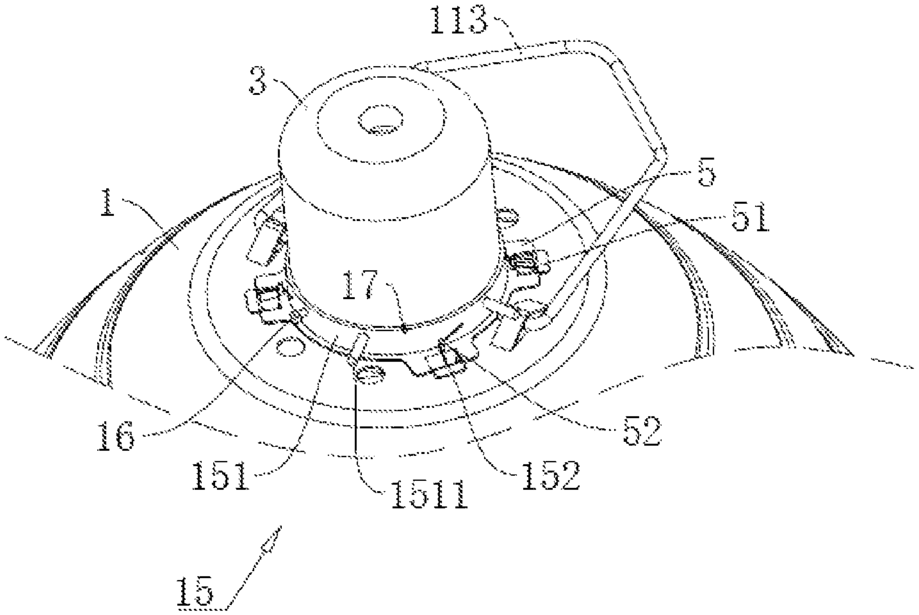
FIG. 9 is a schematic diagram showing a driving assembly according to the embodiment of the disclosure.

Referring to FIG. 8 and FIG. 9, when removing the fixing seat 3 from the cover body 1, the buckles 51 need to be removed from the corresponding snap-fit holes 112 in sequence, and then the fixing seat 3 can be removed. In order to make the process of disassembling the fixing seat 3 easier, the fixing seat 3 is provided with a driving assembly 15. The driving assembly 15 includes a connecting ring 151 and a connecting rope 152. The connecting ring 151 is circular. The inner diameter of the connecting ring 151 is the same as the outer diameter of the fixing seat 3. The connecting ring 151 is coaxially sleeved on the outer wall of the fixing seat 3, so that the inner wall of the connecting ring 151 and the outer wall of the fixing seat 3 abut against each other, and the connecting ring 151 and the fixing seat 3 are rotatably connected. The connecting rope 152 is a relaxed rope body and cannot be extended. There are four connecting ropes 152, and they correspond to the four buckles 51 respectively. The first end of the connecting rope 152 is fixedly connected to the outer wall of the connecting ring 151, and the second end of the connecting rope 152 is fixedly connected to an end of a corresponding buckle 51. Therefore, when the connecting ring 151 is rotated, the connecting ring 151 can drive the end of the connecting rope 152 to rotate, until the connecting rope 152 is in a tight state. Then as the connecting ring 151 rotates, the end of the connecting rope 152 away from the connecting ring 151 can drive the buckle 51 moves, so that the buckle 51 retracts gradually. When the width of the buckle 51 is smaller than the width of the snap-fit hole 112, the buckle 51 is disengaged from the snap-fit hole 112. At this time, the fixing seat 3 can be taken out directly.

In particular, the outer wall of the fixing seat 3 is screwed with a limiting post 17. The limiting post 17 is located on the side of the connecting ring 151 away from the mounting sheet 5. The limiting post 17 is arranged in the radial direction of the connecting ring 151, and the limiting post 17 abuts against the connecting ring 151. Therefore, the limiting post 17 can prevent the connecting ring 151 from being detached from the fixing seat 3, so that the connecting ring 151 and the connecting rope 152 can function normally.

In order to facilitate the rotation of the connecting ring 151, a lever 1511 is fixedly connected to the outer wall of the connecting ring 151. The lever 1511 is arranged in the radial direction of the connecting ring 151. There is a plurality of levers 1511 arranged in a circumferential direction.

In order to make it easier for the connecting rope 152 to drive the end of the buckle 51 to move, a guide rod 52 is fixedly connected to the side of the mounting sheet 5 away from the buckle 51. There are four guide rods 52 corresponding to four buckles 51 respectively. The guide rods 52 and the corresponding buckles 51 are located in the same radial direction of the mounting sheet 5. The guide rods 52 are perpendicular to the surface of the mounting sheet 5. Each connecting rope 152 is turned around the corresponding guide rod 52. Therefore, when the connecting rope 152 is tightened, the end of the connecting rope 152 close to the buckle 51 is arranged in the radial direction of the fixing seat 3, so that the connecting rope 152 is easier to drive the end of the buckle 51 to move.

In order to prevent the user from rotating the connecting ring 151 in the opposite direction, and to make the operation easier, a bump 1512 is fixedly connected to the outer wall of the connecting ring 151, and a stopper 53 is fixedly connected to the side of the mounting sheet 5 close to the guide rod 52. The rotation of the connecting ring 151 can drive the bump 1512 to rotate. When the bump 1512 abuts against the stopper 53, the connecting rope 152 is turned around the corresponding guide rod 52. The connecting rope 152 is in a tight state, and the buckle 51 is not deformed. Therefore, due to the blocking effect of the stopper 53 on the bump 1512, the connecting ring 151 can only be rotated in one direction at this time. The rotation of the connecting ring 151 can cause the connecting rope 152 to be pulled, so that the buckle 51 is gradually disengaged from the snap-fit hole 112.

In order to prevent the connecting ring 151 from accidentally rotating and causing the buckle 51 to loosen, a round hole is configured on the outer wall of the connecting ring 151. An internal thread is provided on the inner wall of the round hole. A limiting bolt 16 is screwed in the round hole. A socket is configured on the outer wall of the fixing seat 3. The socket is circular. The depth of the socket is smaller than the thickness of the side wall of the fixing seat 3. When the bump 1512 and the stopper 53 abut against each other, the limiting bolt 16 and the socket are in a coaxial position. At this time, the end of the limiting bolt 16 is inserted into the socket to limit the rotation of the connecting ring 151 relative to the fixing seat 3. Thereby, the connecting ring 151 is fixedly connected to the fixing seat 3. Therefore, the connecting ring 151 will not rotate under normal conditions, and the connecting rope 152 will not exert pulling force on the end of the buckle 51. Therefore, the buckle 51 can normally fit with the snap-fit hole 112, which helps to ensure that connection stability of the fixing seat 3 and the cover body 1.

The implementation principle of an easily assembled and disassembled lampshade in the embodiment of the disclosure is as follows: the manufacturer assembles the fixing seat 3 and the bulb holder 2 during the production process. The mounting sheet 5 is sleeved on the outer wall of the bulb holder 2 at first. Then the fixing seat 3 is screwed therein, so that the fixing seat 3 and the bulb holder 2 abut against both sides of the mounting sheet 5, thereby the fixing seat 3 and the bulb holder 2 are fixed connected together. The installation of the mounting sheet 5 and the buckle 51 is completed. After that, the connecting ring 151 is sleeved on the outer wall of the fixing seat 3 and the connecting ring 151 abuts against the mounting sheet 5. Then the limiting post 17 is screwed to the outer wall of the fixing seat 3, so as to limit the connecting ring 151. Then the limiting bolt 16 is screwed into, so as to fix the connecting ring 151. Then, the connecting ropes 152 are connected in sequence. Then the fixing seat 3, the mounting bracket and the cover body 1 are put into the packaging bag, and the user can assemble it by themselves.

When assembling, the user inserts the buckle 51 on the fixing seat 3 into the snap-fit hole 112 on the cover body 1 and fixedly connects the fixing seat 3 to the cover body 1. Then, the two clamping plates 71 are placed on both sides of the fixing seat 3 respectively, and the two arc portions 712 abut tightly against the outer wall on both sides of the fixing seat 3 respectively. And then tightening the locking nut 73 to fix the two clamping plates 71 and the fixing seat 3, thereby completing the installation of the lampshade.

After the installation is completed, placing the bulb in the cover body 1 and screwing the end of the bulb into the screw hole 211 on the bulb holder 2. When it is necessary to adjust the orientation of the cover body 1 and the bulb, rotating the worm 101, so that the clamping plates 71 drive the cover body 1 to rotate to adjust the orientation of the cover body 1. Then sliding the tooth block 142 to the side away from the gear 141, and rotating the mounting block 8. The mounting block 8 drives the cover body 1 to rotate by means of the clamping plate 71, thereby further adjusting the orientation of the cover body 1. After the adjustment is completed, loosening the tooth block 142. The spring 143 enables the tooth block 142 to abut against the gear 141, thereby limiting the rotation of the gear 141 and the mounting block 8, so as to fix the cover body 1 in the current orientation. The adjustment is completed.

When the fixing seat 3 needs to be removed, rotating the connecting ring 151. The connecting ring 151 drives the end of the connecting rope 152 to move, and the connecting rope 152 drives the end of the buckle 51 to move until the buckle 51 is disengaged from the snap-fit hole 112. And then taking out the fixing seat 3.

The above are optional embodiments of the disclosure, and do not limit the scope of protection of the disclosure. Therefore, any equivalent changes made based on the structure, shape, and principle of the disclosure shall be covered by the protection scope of the disclosure.

What is claimed is:

1. A lampshade, comprising: a cover body, a bulb holder and a fixing seat, wherein the bulb holder is in threaded connection with the fixing seat, the fixing seat is provided with a plurality of buckles, and the cover body is provided with a plurality of snap-fit holes for insertion of the plurality of buckles.

2. The lampshade according to claim 1, wherein a mounting sheet is slidably sleeved on an outer side of the bulb holder, the plurality of buckles are arranged at equal intervals on the mounting sheet, and the mounting sheet is located between the bulb holder and the fixing seat.

3. The lampshade according to claim 1, further comprising: a mounting bracket, wherein the mounting bracket comprises a first fixing clip and a second fixing clip disposed at an end of the first fixing clip, the second fixing clip comprises two clamping plates, a locking bolt and a locking nut, the two clamping plates are configured to clamp an outer wall of the fixing seat, the locking bolt passes between the two clamping plates, and the locking nut is screwed onto the locking bolt.

4. The lampshade according to claim 3, wherein the first fixing clip is provided with a mounting block, the mounting block is rotatably connected with a rotating rod, the rotating rod slidably passes between the two clamping plates, the rotating rod is provided with a limiting block, each of the two clamping plates is provided with a limiting slot for passing through by the limiting block, an adjustment assembly is provided between the mounting block and the rotating rod, the adjustment assembly comprises a worm and a worm gear, the worm is rotatably arranged on the mounting block, the worm gear is coaxially arranged on the rotating rod, and the worm gear is engaged with the worm.

5. The lampshade according to claim 4, wherein a support disc is provided on the first fixing clip, the mounting block is rotatably arranged on the support disc, a locking assembly is provided between the support disc and the mounting block, the locking assembly comprises a gear, a tooth block and a spring, the gear is arranged on the mounting block, an axis of the gear is coaxial with a rotation axis of the mounting block, the tooth block is slidably arranged on the support disc, the spring is connected between the tooth block and the support disc, teeth of the tooth block are arranged towards the gear, and the tooth block abuts against the gear by means of the spring.

6. The lampshade according to claim 2, wherein a driving assembly is provided on the fixing seat, the driving assembly comprises a connecting ring and a plurality of connecting ropes, the connecting ring is sleeved on an outer side of the fixing seat, the connecting ring is rotatably connected with the fixing seat, a number of connecting ropes in the plurality of connecting ropes is equal to a number of buckles in the plurality of buckles, a first end of each of the plurality of connecting ropes is connected to an outer side of the connecting ring, and a second end of each of the plurality of connecting ropes is connected to a corresponding one of the plurality of buckles.

7. The lampshade according to claim 6, wherein the connecting ring is screwed with a limiting bolt, and the fixing seat is provided with a socket for insertion of an end of the limiting bolt.

8. The lampshade according to claim 7, wherein a guide rod is provided on a side of the mounting sheet on which one of the plurality of buckles is arranged, and when a corresponding one of the plurality of connecting ropes abuts against the guide rod, a section of the corresponding one of the plurality of connecting ropes abutting against the one of the plurality of buckles is arranged along a radial direction of the fixing seat.

9. The lampshade according to claim 6, wherein a lever is provided on the outer side of the connecting ring.

10. The lampshade according to claim 8, wherein a bump is provided on the outer side of the connecting ring, a stopper is provided on the mounting sheet, and when the bump abuts against the stopper, the plurality of connecting ropes are in a stretched state and the plurality of buckles are not deformed.

* * * * *